United States Patent

[11] 3,598,906

[72] Inventors Katsuhito Uetake; Seishiro Iwamura; Yoshihisa Nishitani, all of Otokuni-gun, Kyoto, Japan

[21] Appl. No. 792,095
[22] Filed Jan. 17, 1969
[45] Patented Aug. 10, 1971
[73] Assignee Mitsubishi Denki Kabushiki Kaisha Tokyo, Japan
[32] Priority Jan. 23, 1968, Jan. 24, 1968, Jan. 24, 1968
[33] Japan
[31] 43/3867, 43/4134 and 43/4654

[54] FINE TUNING INDICATOR
2 Claims, 5 Drawing Figs.

[52] U.S. Cl. .......... 178/5.8 R
[51] Int. Cl. .......... H04n 5/50
[50] Field of Search .......... 178/6, 7.5, 5.8 A, 5.8; 325/455

[56] References Cited

UNITED STATES PATENTS 2,943,145 6/1960 Parker .......... 178/5.8 A
3,003,029 10/1961 Tults et al. .......... 178/7.5 E

OTHER REFERENCES

A.V.J. Martin, " Pix Tube As Tuning," Electronics World, July 1960, Pages 46 and 94.

*Primary Examiner*—Richard Murray
*Assistant Examiner*—Alfred H. Eddleman
*Attorneys*—Robert E. Burns and Emmanuel J. Lobato

ABSTRACT: A saturable magnetic core is disposed in a magnetic field whose strength becomes maximum for correct tuning of a television receiver. A sawtooth current for horizontal scanning flows through one of two windings on the core to induce pulses across the other winding on the core, each pulse having a duration controlled by the field in each scan interval. The pulses are applied to a picture tube to form a variable width vertical line on its faceplate. A tuning knob rotates to decrease the line width to about zero which to indicate correct tuning of the receiver.

FINE TUNING INDICATOR

BACKGROUND OF THE INVENTION

This invention relates in general to a fine tuning indicator device for aiding in finely tuning television receivers, and more particularly to such a device for the indication of response in television receivers for correct tuning on a faceplate or a phosphor screen of a picture tube involved.

Lately, television broadcasting has included transmitted colored picture signals and UHF television bands, and it has been increasingly demanded that the received pictures have a high quality. This has led to the necessity of incorporating a tuning indicator into a television receiver. Heretofore it has been practiced to use visual indicators such as electron-ray tubes, tuning point indicating meters etc. as the tuning indicators. As the television receivers are devices for originally indicating the visual information, it is unreasonable to add a separate visual indicating device to indicate the response in the receivers for correct tuning. If it is possible to indicate the correct tuning of television receivers on the phosphor screens of the picture tubes involved, the receivers can be inexpensively produced and easily adjusted to correct tuning without the necessity of incorporating the above-mentioned additional visual indicator into the receiver.

SUMMARY OF THE INVENTION

Accordingly it is an object of the invention to provide a new and improved fine tuning indicator device for use in a television receiver.

It is another object of the invention to provide a new and improved fine tuning indicator device for use in a television receiver utilizing a picture tube involved to visually indicate the response of the receiver for correct tuning.

It is still another object of the invention to provide a new and improved device for visually indicating the correct tuning of a television receiver, which device is simple in construction and inexpensively manufactured, and which indicates the direction in which the particular adjustment must be effected to correctly tune the receiver.

With the above cited objects in view, the invention resides in a fine tuning indicator device for use in a television receiver to indicate the response of the receiver for correct tuning on a faceplate of a picture tube disposed in the receiver, comprising means for generating pulse signals in synchronization with the scanning of the picture tube one for each scan interval, means applied with the pulse signals to modulate an electron beam in the picture tube to develop a line-shaped pattern variable in width on the faceplate of the picture tube, and means for changing the width of the line-shaped pattern in accordance with a deviation of the response of the receiver from the response thereof for correct tuning.

In a preferred embodiment of the invention the pulse generating means may include a saturable magnetic core, a first winding inductively disposed on the magnetic core and connected to a source of sawtooth current provided by an output of a horizontal deflection circuit for the picture tube, and a second winding inductively disposed on the magnetic core to generate the pulse signals while; and, the width changing means may comprise field establishing means including a magnetic core with having an airgap, and a winding inductively disposed on the magnetic core for carrying a direct current which varies in magnitude in accordance with a deviation of the resonance of the television receiver from the response thereof for correct tuning, thereby establishing a magnetic field having a variable strength in which the pulse generating means are disposed.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
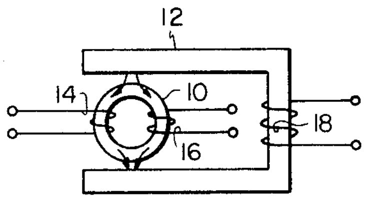
FIG. 1 is a diagrammatic view of a pulse generating device which is used with the invention.

Referring now to the drawing and in particular to FIG. 1, there is illustrated a pulse generating device which is sued with the invention. The device illustrated comprises a saturable magnetic core 10 in the form of a toroid of any suitable ferromagnetic material having a low coercive force and a high permeability such as ferrite; a U-shaped magnetic core 12, of any suitable ferromagnetic material, having the toroidal core 10 sandwiched between two legs of the "U" with a narrow gap formed between the core 10 and each leg; a first and a second winding 14 and 16 respectively inductively disposed on the toroidal magnetic core 10; and a third winding 18 inductively disposed on the bottom of the "U".

Figure 2:
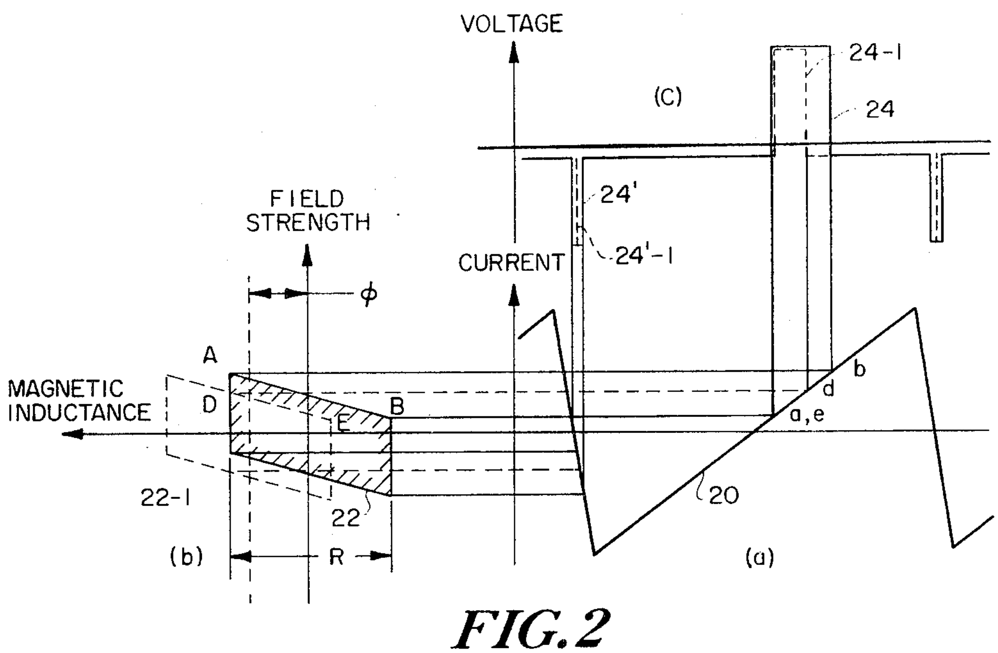
FIGS. 2*a*, *b* and *c* are curves useful in explaining the operation of the device illustrated in FIG. 1.

A transformer unit composed of the toroidal magnetic core 10 and the windings 14 and 16 is so designed and constructed that when the first or exciting winding 14 has flowing therethrough a sawtooth current, as shown at waveform 20 in FIG. 2*a*, the ferromagnetic material for the core 10 can readily be saturated to exhibit a magnetic hysteresis loop such as shown in FIG. 2*b*, wherein the vertical axis represents a magnetic field strength or a magnetomotive force and the horizontal axis represents a magnetic induction or a magnetic flux. On the other hand, the U-shaped magnetic core 12 along with the third or control winding 18 forms means for establishing between the two legs of the "U", a magnetic field in which the transformer unit 10–14–16 is disposed.

With no direct current flowing through the control winding 18 to provide zero field for the transformer unit, the sawtooth current 20 flowing through the exciting winding 12 causes the ferromagnetic material for the core 10 to describe a magnetic hysteresis loop as shown at solid line 22 in FIG. 2*b*. Due to a rapid change in magnetic flux between points B and A on the loop (see FIG. 2*b*) the second or output winding 16 provides a positive rectangular pulse voltage 24 having a pulse width or a duration substantially equal to the projection on the time axis of a segment between points *a* and *b* on the ascending portion of the sawtooth waveform 20, with the points *a* and *b* substantially corresponding to the points A and B on the magnetic hysteresis loop 22 (see FIGS. 2*a*, *b* and *c*). Similarly, the output winding 16 will provide a negative rectangular pulse voltage as shown at solid line 24' in FIG. 2*c* for the descending portion of the sawtooth waveform 20.

When a direct current flows through the control winding 18, the magnetic core 10 is disposed in a magnetic field established by the magnetic core 12, and a magnetic flux $\Phi$ is developed in the ferromagnetic material for the core 10, which flux $\Phi$ is proportional to the magnitude of the control current flowing through the control winding 18, and results from a flow of sawtooth current through the exciting winding 14, with the result that the material for the magnetic core 10 describes a magnetic hysteresis loop as shown at dotted line 22–1 in FIG. 2*b*. However, the number of lines of magnetic force in the core material can not increase beyond a range as designated by the reference numeral "R" in FIG. 2*b* because of its magnetic saturation. Under these circumstances, the output winding 16 responds to the ascending portion of the sawtooth waveform 20 to provide a positive pulse voltage, in a similar manner as described above, except that it terminates at a time point corresponding to the intersection D of both the loops 22 and 22–1. That is, that pulse voltage has a pulse width or a duration substantially equal to the projection on the time axis of a segment between points *d* and *e* on the sawtooth waveform 20 which, in turn, corresponds to the points D and E on the loop 22–1. The pulse voltage is shown at dotted line 24'–1 in FIG. 2*c* and is narrower than the pulse voltage 24. Similarly the output winding 16 responds to the descending portion of the sawtooth waveform 20 to provide a negative pulse voltage as shown at dotted line 24'–1 in FIG. 2*c*.

Thus it will be appreciated that a direct current flows through the control winding 18 to control the pulse width or duration of the pulse voltage generated by the output winding 16. The invention utilizes the phenomenon just described.

Figure 3:
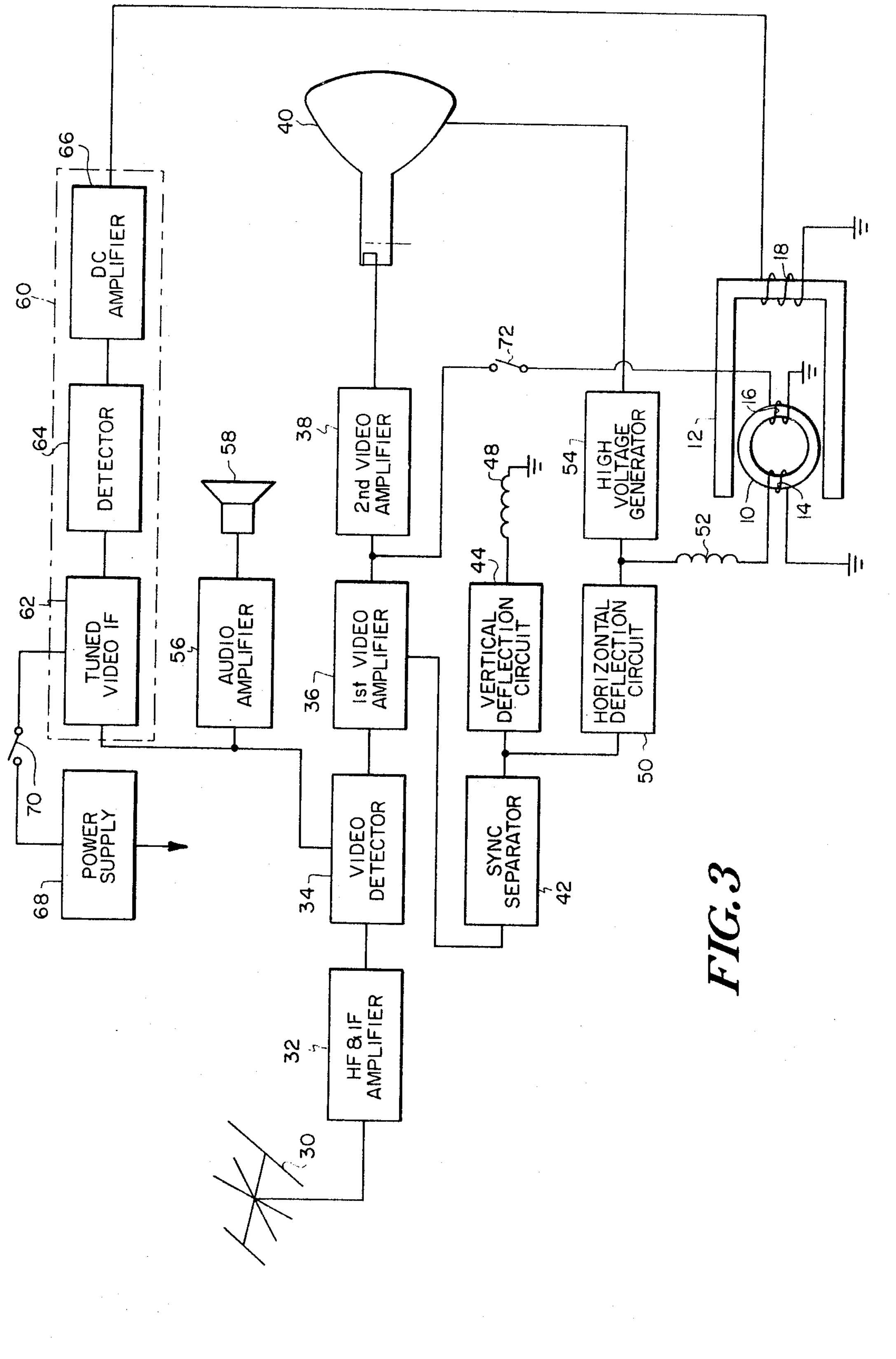
FIG. 3 is a block diagram of a television receiver including a fine tuning indicator constructed in accordance with the principles of the invention.

Referring now to FIG. 3, there is illustrated a television receiver including a fine tuning indicator device constructed in accordance with the principles of the invention. The arrangement illustrated comprises a television antenna array 30, a high and intermediate frequency amplifier 32, a video detector 34, a first video amplifier 36, and a second video amplifier 38 serially connected in the named order. The output of the second video amplifier 38 is connected to a picture tube 40 in the conventional manner. The first video amplifier 36 is also connected to synchronization separator and amplifier circuitry 42 including automatic gain control (AGC) which is, in turn, connected to a vertical deflection circuit 44 and thence to a vertical deflection coil 48 connected to ground. The circuit 42 is further connected to a horizontal deflection circuit 50 which is connected to both a horizontal deflection coil 52 and a high voltage generator 54 which is, in turn, connected to the picture tube 40 in the well-known manner.

The video detector 34 is also connected through an audio circuit 56 to a loudspeaker 58.

All the components as above-described are of the conventional construction and need not be further described.

According to the principles of the invention the video detector 34 is connected to an indication current generator shown at dotted block 60 in FIG. 3 for generating a current indicating the response of the television receiver for correct tuning. The current generator 60 includes a video intermediate frequency amplifier 62 tuned to be resonant at the video intermediate frequency and connected to the video detector 34, a detector 64 connected to the tuned amplifier 62 to detect the output therefrom to provide a direct current, and a direct current amplifier 66.

Any suitable source 68 of electrical energy is adapted to supply an electrical energy to the current generator 60 through a switch 70. The output of the direct current amplifier 66 is connected to one end of a control winding 14 of a pulse generating device such as previously described in conjunction with FIG. 1. The junction of the first and second video amplifiers 36 and 38 is connected through a switch 72 to one end of an output winding 16 of the transformer including an exciting winding 12 serially connected to the horizontal deflection coil 52. The three windings 12, 14 and 16 are connected at the other ends to ground.

The switches 70 and 72 are normally open and may be preferably pushbutton switches. Both the switches are adapted to be closed manually or by a fine tuning knob (not shown) only during the fine tuning operation.

Figure 4:
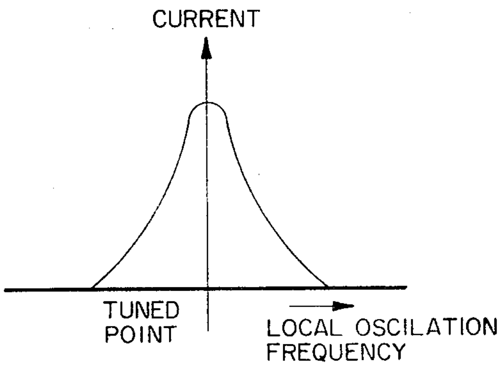
FIG. 4 is a waveform provided by the dotted block shown in FIG. 3.

Since the current generator 60 includes the amplifier 62 tuned to be resonant at the video intermediate frequency the output therefrom or from the amplifier 66 has a frequency response characteristic as shown in FIG. 4. That is, the direct current provided by the DC amplifier 66 has a maximum magnitude at the video intermediate frequency and decreases in magnitude as the response of the television receiver deviates from the resonance thereof for correct tuning. Assuming that the exciting transformer winding 12 is sufficiently less in impedance than the horizontal deflection coil 52, a current flowing through the exciting winding 12 will have a sawtooth waveform substantially identical to the waveform 18 as shown in FIG. 2*a*. In this case, the ascending portion of the sawtooth waveform 18 corresponds to one horizontal scan interval, and the descending portion thereof corresponds to one retrace interval of horizontal deflection.

To finely tune the television receiver, a fine tuning knob (not shown) is rotated with the switches 70 and 72 closed in the manner as previously described. This rotational movement of the knob causes a change in local oscillation frequency involved to provide an output current having a frequency response characteristic such as shown in FIG. 4 from the direct current amplifier 66. This current flows through the control winding 18 to provide a magnetic field proportional to the field of the transformer unit 10–14–16. On the other hand, a horizontal sweep-current of sawtooth waveform flows through the exciting winding 14 of the unit and cooperates with the now established field to provide pulses in the manner as described in conjunction with FIGS. 2*a*, *b* and *c*. More specifically, the output winding 16 provides a pair of positive and negative pulses, such as shown at 24 and 24' or 24–1 and 24'–1 in FIG. 2*c*, in each of the horizontal scan intervals, and in each of the retrace intervals respectively, with the pulse width or duration of each pulse controlled by the magnitude of the field, and therefore by the direct current flowing through the control winding 18. These pulses are applied to an input to the second video amplifier 38 through the now closed switch 72. The negative pulses have no effect upon the system because they appear in the retrace intervals. The positive pulses applied to the second video amplifier 38 serve to modulate an electron beam generated in the picture tube 40 to display a vertical line in a raster on its faceplate 40*a* as shown at 74 or 76 in FIG. 5*a* or *b*, as the case may be. With the video signal applied to the cathode of the picture tube, the positive pulses from the output winding 16 may be inverted in polarity and applied to a grid of an amplifier tube in the second video amplifier 38 to develop a black vertical line in the raster on the faceplate of the picture tube.

Figure 5:
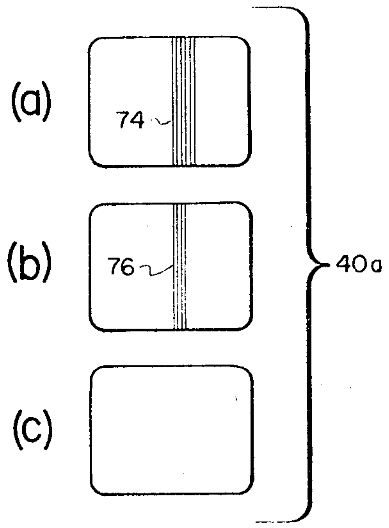
FIGS. 5*a*, *b* and *c* are views illustrating the manner in which the response of a television receiver, being adjusted for correct tuning, is illustrated on a faceplate of a picture in accordance with the principles of the invention.

It is assumed that, with the television receiver correctly turned, the video amplifier 38 has been adjusted to provide a maximum output while the direct current amplifier 66 has been adjusted to provide such an output that the vertical line appears in the raster on the faceplate 40*a* with zero or minimum width. Under these circumstances, it will be seen that if the television receiver is not tuned the particular vertical line having a visible width appears in the raster on the faceplate 40*a* as shown in FIG. 5*a* or *b*. In order to correctly tune the television receiver, it is required only to rotate the associated knob in a direction so that the vertical line will decrease in width until it has zero or minimum width (see FIG. 5*c*).

Thereafter the current generator 60 is deenergized and the pulses from the output winding 16 are prevented from being applied to the video amplifier 38 through the opening of the switches 70 and 72. At that time the vertical line on the faceplate completely disappears.

It is to be understood that instead of the horizontal deflection current a sawtooth wave provided by integrating the retrace pulses may flow through the exciting winding 14 with satisfactory results according to the principles of the invention.

What we claim is:

1. A fine tuning indicator device for use in a television receiver to indicate the response of the receiver for correct tuning, said receiver having a horizontal deflection circuit for generating an output current having a sawtooth waveform comprising means for establishing a magnetic field having a strength which varies in accordance with a deviation of the response of the receiver from the response thereof for correct tuning, pulse generating means disposed in said magnetic field and including a saturable magnetic core, a first winding inductively disposed on said magnetic core and connected to said horizontal deflection circuit to receive said output current having a sawtooth waveform, and a second winding inductively disposed on said magnetic core to produce one pulse signal in each horizontal scan interval, said pulse signal having a duration which varies with the strength of said magnetic field, and indicating means connected to said second winding for indicating the accuracy of fine tuning in response to said pulse signals.

2. In a fine tuning indicator device for use in a television receiver to indicate the response of the receiver for correct tuning in accordance with the modulation of an electron beam causing a visible presentation on a picture tube of the receiver, said receiver having video circuit means, and a horizontal scanning circuit for generating a sweep signal for causing said electron beam to scan said picture tube, an improvement comprising: pulse generating means including a transformer having a saturable magnetic core and first and second windings inductively disposed on said core, said first winding being coupled to said horizontal scanning circuit for receiving said sweep signal for inducing pulse signals across said second winding, and said second winding being coupled to said video circuit means; pulse width changing means having magnetic field establishing means including a control winding, and including a magnetic core having an airgap and having said control winding inductively disposed thereon; DC current generating means connected to said control winding for producing DC current which varies in magnitude in accordance with a deviation of the response of the receiver from the response thereof for correct tuning, said field establishing means being disposed adjacent said saturable magnetic core for varying the pulse widths of said pulse signals according to the magnitude of said DC current, whereby said pulse signals applied to said video circuit means modulate said electron beam in response to the width variations of said pulse signals to produce a line shaped indication on said picture tube.